Oct. 2, 1934.   J. A. BUTTERFIELD   1,975,500
LUBRICATING WRIST PIN BEARING
Filed April 5, 1932
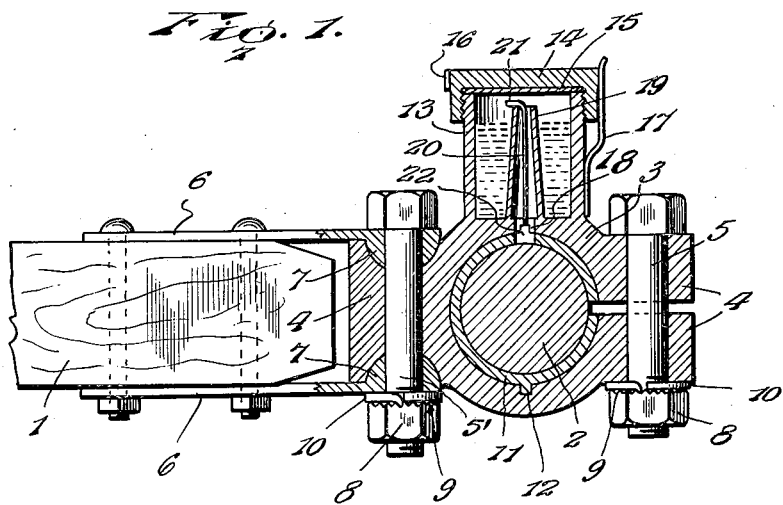
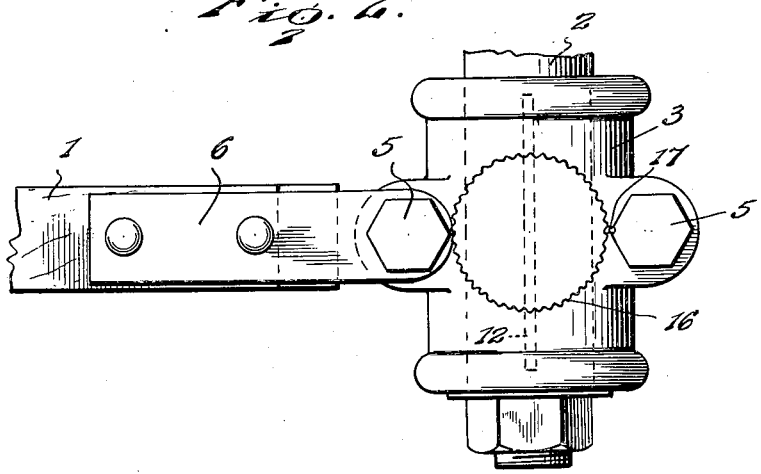
Inventor
J. A. Butterfield.
By Lacey & Lacey, Attorneys Patented Oct. 2, 1934

1,975,500

UNITED STATES PATENT OFFICE 1,975,500

LUBRICATING WRIST-PIN BEARING

James A. Butterfield, Burnt Ranch, Oreg.

Application April 5, 1932, Serial No. 603,307

1 Claim. (Cl. 308—124)

This invention relates to the connection between a pitman and a wrist-pin which drives the pitman and has for its object the provision of a structure which will permit thorough lubrication of the bearing without excessive use of the lubricating oil and which may be readily adjusted to compensate for wear. Other objects of the invention will appear incidentally in the course of the following description.

In the accompanying drawing, Figure 1 is a view, partly in section and partly in elevation, of a structure embodying the invention, Fig. 2 is a top plan view of the same.

In the drawing, the reference numeral 1 indicates an end of a pitman and the numeral 2 indicates a wrist-pin or crank by which the pitman is driven. The wrist-pin passes through a sleeve or box 3 which is split, as clearly shown in Fig. 1, and provided at the sides of the split with mating flanges 4 through which a securing bolt 5 is inserted to clamp the box or bearing around the wrist-pin. The pitman is provided with attaching leaves 6 upon its opposite sides and these leaves project beyond the end of the pitman and are provided on their inner opposed sides with semi-spherical enlargements or lugs 7 adapted to engage within correspondingly shaped recesses or seats formed in the sides of the box with which they are engaged, this arrangement providing for relative pivotal movement between the end of the pitman and the box, as will be understood. The enlargements or lugs 7 are provided with alined openings for the reception of a securing bolt 5'. The nuts 8 fitting upon the bolts 5 and 5' are provided with corrugations, indicated at 9, upon their bases and these corrugations are engaged by spring washers 10 whereby the nuts, when turned home, will be locked against reverse movement. Fitted through the bearing or box 3 is a bushing 11 which closely encircles the wrist-pin, as shown in Fig. 1, and, to prevent relative movement of the bushing in the box, a longitudinal rib 12 is formed upon the exterior circumference of the bushing and seats in a groove provided therefor in the box. Formed on or mounted upon the upper side of the bearing or box 3 is a reservoir 13 to hold lubricating oil and this reservoir is exteriorly threaded at its upper end whereby it may be engaged by a cap 14 to prevent loss of the lubricant. A washer 15 is fitted upon the upper edge of the reservoir so as to avoid leakage through the joint and the cap is peripherally corrugated, as shown at 16, a locking spring 17 being secured upon the box or the container and engaged with one of the corrugations whereby the cap will be held in closed position after it has been turned home upon the container. At the center of the container is provided an opening 18 in the box which leads to a corresponding opening in the bushing so that lubricant may flow from the container to the wrist-pin. A frusto conical tube 19 is formed upon the box around the opening 18 and rises from the box within the container, as clearly shown, so that direct flow of oil from the container to the bearing will be prevented but the oil may be splashed into the open upper end of the tube during the rotation of the crank or wrist-pin and thence find its way to the bearing. To further prevent excessive flow of oil, a retarding pin 20 is disposed within the tube and has its upper end 21 bent laterally so that it may rest upon the end of the tube and thereby support the pin loosely within the tube, the lower end of the pin being equipped with a head or lug 22 which will enter the opening in the bushing and retard the flow of the oil therethrough.

The crank or wrist-pin is rotated by the driving agency and the rotary movement of the wrist-pin is converted into a reciprocatory or oscillatory movement of the pitman in the usual manner. During the rotation of the wrist-pin, the box will be caused to oscillate and oil will be splashed into the outlet tube 19 and find its way to the inner circumference of the bushing and enter between the same and the surface of the wrist-pin. The flow will be slow but steady and the wrist-pin will be thoroughly and constantly lubricated so that wear will be reduced and frictional resistance to the operation of the mechanism will be minimized. As the bushing wears, the securing bolts 5 may be tightened so that the flanges of the box will be set closer together and held in their closer relation so that the bushing will be compressed around the wrist-pin and the proper close joint will be maintained. The device is intended more particularly for use at the wrist-pin connections with pitmen of mowing machines. Heretofore, these connections quickly became loose and there was no means for compensating for the wear and tightening up the bearing so that it would work properly and without rattling. The present invention provides for thorough lubrication and also facilitates adjustment to compensate for wear around the wrist-pin. The pin 21 is spaced from the inner wall of the tube 19 and serves to keep the tube clear and free from clogging as well as to assist in feeding the oil to the bearing while the upper bent end of said pin not only forms a finger piece to facilitate removing the pin from the tube when necessary but by engagement with the upper or small end of said tube serves to center the pin therein.

Having thus described the invention, I claim,

A wrist pin bearing comprising a box split longitudinally at one side thereof to form mating flanges, a fastening device fitting through the flanges to secure the box around a wrist pin, a longitudinally split bushing fitting within the box to encircle the wrist pin and keyed to said box, said fastening device adjusting the box and bushing to compensate for wear a container projecting upwardly from the box and integral therewith, the bottom of the container and said bushing being formed with vertically alined openings, a cap for the upper end of the container, a frusto conical tube integral with and extending upwardly from the bottom of the container around the opening therein and having a downwardly flared bore communicating with said opening, the small upper end of the tube being open and spaced from the lower face of the cap and communicating with the interior of the container, a retarding pin centered within the bore of the tube and spaced from the tapered wall thereof throughout the entire length of said tube, the upper end of the pin being bent laterally beyond the exterior wall of the tube and normally resting on the small end thereof and the lower end of the pin being provided with a lug extending through the opening in the bottom of the container and snugly fitting within the opening in the bushing.

JAMES A. BUTTERFIELD. [L. S.]